(12) United States Patent
Runtze et al.

(10) Patent No.: US 6,671,004 B1
(45) Date of Patent: Dec. 30, 2003

(54) METHOD AND APPARATUS FOR CONVERGENCE CORRECTION IN A TELEVISION SET

(75) Inventors: Albert Runtze, Villingen-Schwenningen (DE); Jacques Chauvin, Mönchweiler (DE)

(73) Assignee: Thomson Licensing S.A., Boulogne (FR)

( * ) Notice: Subject to any disclaimer, the term of this patent is extended or adjusted under 35 U.S.C. 154(b) by 75 days.

(21) Appl. No.: 09/588,304

(22) Filed: Jun. 6, 2000

(30) Foreign Application Priority Data

Jun. 10, 1999 (DE) .......................... 199 26 487
Aug. 19, 1999 (DE) .......................... 199 39 344

(51) Int. Cl.[7] .......................... H04N 3/22; H04N 3/26
(52) U.S. Cl. .......................... 348/745; 348/747
(58) Field of Search .......................... 348/75, 747, 746, 348/658, 190, 191, 806, 807; 315/368.11, 368.12, 368.18, 377; H04N 3/22, 3/26, 3/23, 2/223

(56) References Cited

U.S. PATENT DOCUMENTS

| | | | |
|---|---|---|---|
| 5,923,366 A | 7/1999 | Kawashima et al. | ........ 348/190 |
| 6,201,569 B1 * | 3/2001 | Kawashima et al. | ........ 348/745 |

FOREIGN PATENT DOCUMENTS

| | | | |
|---|---|---|---|
| DE | 3311971 | 10/1984 | ............ H04N/5/74 |
| EP | 0420568 | 4/1991 | ............ H04N/9/28 |
| EP | 0555094 | 8/1993 | ............ H04N/9/29 |
| EP | 0703714 | 3/1996 | ............ H04N/9/28 |
| JP | 7-184222 | 7/1995 | ............ H04N/9/28 |
| JP | 7-336701 | 12/1995 | ............ H04N/9/28 |
| JP | 7-336708 | 12/1995 | ............ H04N/9/28 |
| JP | 9-37277 | 2/1997 | ............ H04N/9/28 |

OTHER PUBLICATIONS

Shiomi, Makoto et al: A Fully Digital Convergence System for Projection TV, IEEE Transactions on Consumer Electronics, vol. 36 No. 3, Aug. 1990, S. 445–453.

Buttar, A et al. A High Performance Digital Convergence and Focus System For Projection TV, IEEE Tranactions on Consumer Electronics Vol. 38, No. 3, Aug. 1992, S–734–740.

* cited by examiner

*Primary Examiner*—Michael H. Lee
(74) *Attorney, Agent, or Firm*—Joseph S. Tripoli; Harvey D. Fried; Francis A. Davenport (57) ABSTRACT

A method for convergence correction in a projection television display having a monochromatic tube for each of the three primary colors red, green and blue, whose images can be projected on a screen. Each tube has an associated deflection correction device which comprises a convergence circuit. Convergence correction values are determined by measurement using sensors with screen edge locations which cannot be seen. Convergence correction values are calculated for the entire screen by interpolation between these values.

14 Claims, 5 Drawing Sheets

METHOD AND APPARATUS FOR CONVERGENCE CORRECTION IN A TELEVISION SET

FIELD OF THE INVENTION

The invention relates to a method for automatic convergence correction in a television set, and to a television set having a convergence correction device.

BACKGROUND OF THE INVENTION

Convergence correction devices are used for correction of parameters in the raster deflection, for example for correction of north/south and east/west distortion, pin-cushion distortion, nonlinearity in the deflection, and other geometric errors in the horizontal and vertical directions. One particular field of application is convergence correction in a projection television set, in which the pictures from three monochromatic tubes are projected onto a screen. The term television set in this context means any equipment with an electronic raster picture display. The equipment may be fed from a television broadcast signal or else, as a pure monitor, from an RGB signal, a composite video signal, or separately with a light intensity signal and a colour sub-carrier from any desired video signal source.

The deflection parameters are corrected using correction values, which are stored in a convergence circuit. The stored correction values are converted in a digital/analogue converter into an analogue control signal, and are supplied to a driver circuit, which comprises a preamplifier and an output amplifier. This driver circuit emits a current, which corresponds to the correction value, to a correction coil.

The details of such a convergence correction circuit are disclosed, for example, in Applications DE 198 01 968, DE 198 01 966 and DE 42 14 317. The convergence circuit itself is not the subject matter of the present inventions.

The convergence correction values also depend, inter alia, on the earth's magnetic field at the point where the television set is located. This means that the convergence correction must be recorrected after the set has been transported—for example from the manufacturer to the customer—in order to achieve an optimum setting. An entirely corresponding situation also occurs, of course, when the mechanical construction of the set changes as a result of parts being replaced for repair purposes, or as a result of external influences.

In known sets, a raster is displayed on the screen, using the three primary colours red, green and blue, in a special operating mode for convergence correction. The remote control, for example, can now be used to move the three primary colours of the raster such that they coincide, by correcting the convergence values successively for each raster crossing point. The convergence values are stored automatically in a memory provided for this purpose in the set. If, for example, there are eleven horizontal and fifteen vertical raster lines, a horizontal and a vertical correction value can thus be stored for each of the three primary colours for the 165 crossing points, that is to say a total of 990 values. This is time-consuming and tedious, not least because the optimum setting is often not found in a single attempt. Furthermore, this trimming can be carried out only by trained personnel.

SUMMARY OF THE INVENTION

Against this background, the present invention suggests a method which allows convergence correction values to be determined and to be stored considerably more easily.

The method according to the invention has the advantage that the user can easily initiate automatic convergence correction, for example by pushing a button. The method is also distinguished by the fact that it is based on a small number of optical sensors which are arranged outside the viewed area of the screen, and thus have no adverse effect on the picture. Nevertheless, convergence can be corrected over the entire screen.

According to the invention, this result is achieved by interpolation between those correction values which are determined by means of the optical sensors, which cannot be seen and are arranged at the screen edge. DE 197 00 204, for example, discloses the way in which the position of a marker is defined with respect to a sensor. This method is not the subject matter of the present inventions.

In one exemplary embodiment of the invention, the measured correction values are interpolated in the horizontal direction. The determined interpolation functions allow further convergence correction values to be calculated, which are preferably located on vertical lines of the convergence raster. The convergence values determined in this way for their part once again form support points for calculation of interpolation functions which extend in the vertical direction of the screen. The calculation of intermediate values by means of these last-mentioned interpolation functions allows convergence correction values to be defined for each crossing point of the convergence raster.

It has been found to be expedient to use polynomials whose order is limited by the number of respectively available support points as the interpolation function. Straight lines or parabolae are particularly suitable for this purpose. The advantage of these functions is that good convergence correction is achieved with little computation complexity.

In one expedient development of the method according to the invention, a fixed-position marker can be displayed in the region of the screen, which can be seen, and moveable markers in the other primary colours can be moved to coincide with the fixed-position marker. This allows the accuracy of the convergence correction to be increased. It is particularly advantageous if the fixed-position marker is displayed using that light source which allows an image with the least imaging errors, by virtue of its arrangement with respect to the screen. As a rule, this is the colour green.

In a modification of the method according to the invention, the convergence magnetic filed defined in one direction is maintained while each of the others are determined. This makes it possible to move to the required marker position more accurately. It has been found to be advantageous for the initially determined convergence magnetic field to be recorrected once again at the end, when the second convergence magnetic field is fixed. This allows increased convergence correction accuracy to be achieved.

Furthermore, the invention provides a television set, which has all the preconditions to allow the convergence correction method according to the invention and as described initially to be carried out.

One advantage of the television set according to the invention is that the optical sensors, which are required to carry out largely automatic convergence correction are arranged at the edge of the screen, where the viewer can no longer see them.

The television set is expediently also equipped with a video generator, which allows markers to be displayed using all the primary colours, and allows these to be positioned as required on the screen.

The television set is advantageously also provided with a control device which allows the convergence coils of each tube to have a current applied to them such that the actual position of a marker is shifted until this matches a required position, which is governed by the position of a sensor.

In one embodiment of the television set according to the invention, an optical sensor is arranged approximately at the centre of the screen, thus also allowing convergence correction values to be determined in the inner region of the screen.

BRIEF DESCRIPTION OF THE DRAWINGS

The drawing shows examples of the invention, with mutually corresponding elements being provided with the same reference symbols. In the drawing.

DETAILED DESCRIPTION OF PREFERRED EMBODIMENTS

Figure 1:
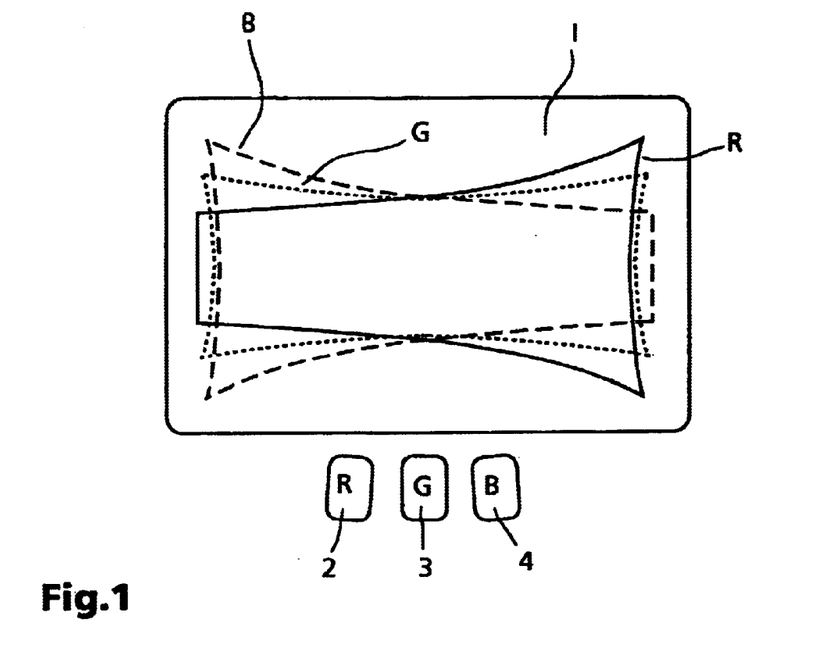
FIG. 1 shows a plan view of the screen of a colour television set according to the invention without convergence correction.

FIG. 1 shows a plan view from the front of the screen 1 of a television set according to the invention, on which the pictures are projected from three monochromatic tubes 2, 3, 4. As is shown schematically in the figure, the tubes 2 . . . 4 are arranged geometrically differently. Imaging errors thus occur on the screen, which are different for the individual tubes. These picture errors are corrected by means of additional correction coils, which are mounted in front of the actual deflection coils, on the coil neck of the tubes. The correction for each individual tube 2 . . . 4 is carried out both in the horizontal direction and in the vertical direction, that is to say there are a total of six correction coils with the associated driver circuits in the television set, and these are each activated by one convergence circuit. A correction coil with the associated circuitry is referred to as a convergence channel, so that the television set has a total of six convergence channels.

Figure 2:
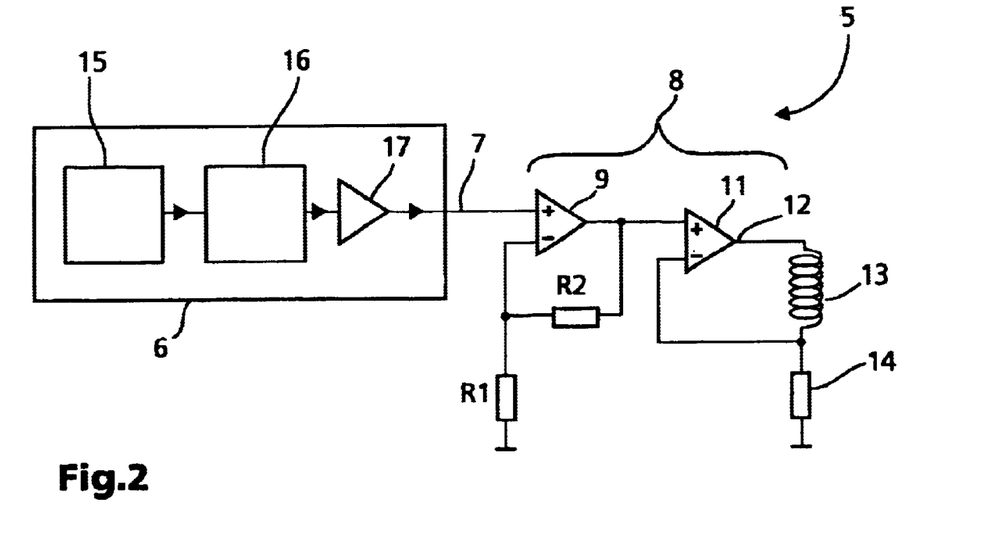
FIG. 2 shows a convergence correction device schematically.

FIG. 2 shows a schematic block diagram of a convergence channel which is denoted overall by 5 as is known from the prior art. A convergence circuit 6, which is in the form of an integrated circuit, is connected by one output 7 to a driver circuit 8 which comprises a preamplifier 9 and an output amplifier 11. The output 12 of the output amplifier 11 is connected to a correction coil 13 which influences the electron beam in the associated tube. The correction coil 13 is connected in series with a measurement resistor 14. Each convergence circuit 6 together with the associated correction coil 13 and driver circuit 8 is referred to as a convergence channel.

The convergence correction is carried out using stored digital convergence correction values. The convergence correction values are stored in a memory 15, denoted by M, in the convergence circuit 6, and are converted in a digital/analogue converter 16 into a corresponding analogue voltage. The voltage is amplified by an amplifier 17 that is integrated in the convergence circuit 6, and is emitted at the output 7 to the driver circuit 8, which produces the desired correction current in the correction coil 13.

The way in which the convergence correction values are processed in order to achieve the desired correction of the raster on the screen is not the subject matter of the present invention. Methods and devices relating to this are displayed, for example, in German Patent Applications DE 197 35 681 and DE 197 04 775.

Figure 3:
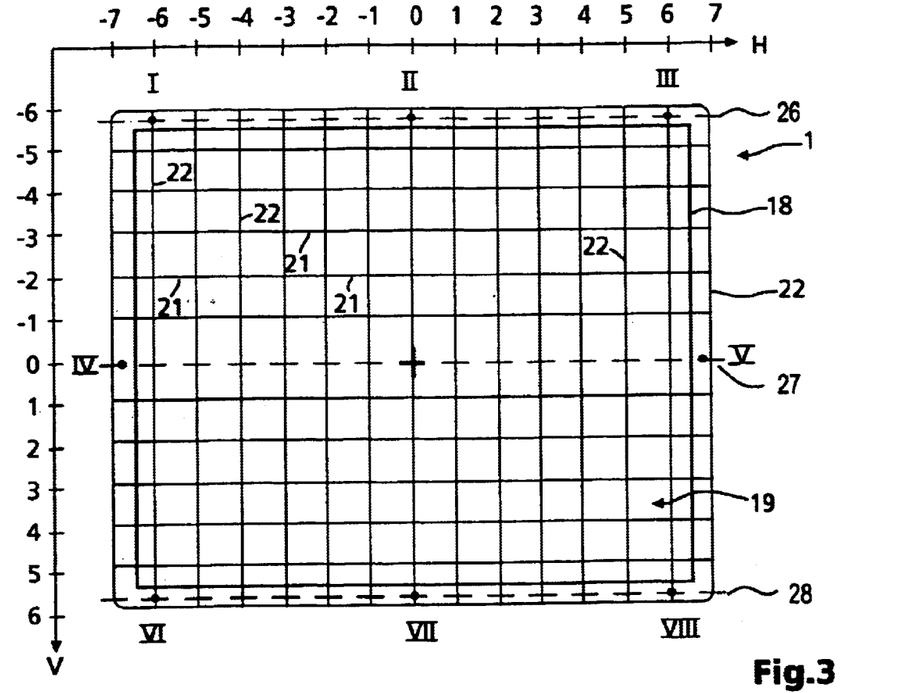
FIG. 3 shows the screen of the television set from FIG. 1 on an enlarged scale with a convergence raster overlaid.

FIG. 3 shows the screen from FIG. 1, on an enlarged scale. The region of the screen which can be seen is surrounded by an edge 18, which is represented by a broad solid line. Eight optical sensors, which are denoted by I to VIII, are arranged outside the edge 18. Furthermore, a convergence raster 19 is shown overlaid on the screen 1, and is formed by thirteen horizontal and fifteen vertical lines 21 and 22, respectively. To simplify the description in the following text, axes H and V with horizontal and vertical coordinates are shown outside the screen 1 in FIG. 3. The convergence raster 19 extends beyond the edge 18, so that the optical sensors I to VIII are located in the region of the raster 19. The sensors are connected to an evaluation circuit, which is not shown in the drawing but which emits an appropriate signal when light falls on one of the sensors. This light is produced in particular by so-called markers, which can also be displayed in the region of the screen which cannot be seen.

The method according to the invention functions as follows:

Based on convergence correction values stored in the memory M (FIG. 2) at the manufacturer's, a green marker is overlaid close to the sensor I on the screen. The marker may have, for example, a rectangular shape. First of all, the marker is now shifted in the horizontal direction. The marker is shifted by varying the current in the convergence coil 13 of the associated convergence channel until the horizontal position of the marker matches the horizontal position of the sensor I, in which case the term matching in this context means that sensor I responds. In the case of optical sensors, this normally means that the marker at least partially covers the sensor.

The way in which the position is determined is described in German Patent Application DE 197 00 204. According to this, the convergence magnetic field at which the position of the marker and the position of the sensor match is determined by moving two rectangular markers from a respective side towards the sensor that is used for measurement. The precise correction value for the horizontal and vertical convergence is then calculated from the two measurements. For the sake of clarity, the present description refers to only one marker, which is indicated as a cross in the figures. For the sake of brevity, the term "response of the sensor" in the following text also means any procedure which allows the position of a marker to be related to that of a sensor. For example, this term covers the situation where a marker respectively approaches a sensor from the left or right in order to use the measured electrical signals to calculate the position at which the marker would be centred on the sensor in the horizontal direction.

The convergence correction value which corresponds to the convergence current in the determined marker position is stored as a new correction value for the horizontal convergence for the colour green. For short, this value is also referred to in the following text as the horizontal correction value for green (EHG1). The size of the marker is chosen such that it always meets the sensor I, even if the convergence errors are large. This procedure is repeated in a corresponding manner for the vertical direction, in order to make the vertical position of the marker match the vertical position of the sensor I. The correction value found in this way is stored as the correction value for the vertical convergence for the colour green (vertical correction value for green, EVG1). Correction values for the horizontal and vertical convergence for the colour green are determined and stored in this way successively for all the sensors I to VIII. After this, the convergence correction values for the two other primary colours, red and blue, are determined in a corresponding way.

It is obvious to a person skilled in the art that the described sequence in which the correction values are carried out is irrelevant. This means that the result for the correction values is independent of whether horizontal or vertical correction values are determined first of all, and independent of the sequence in which the sensors are addressed, and of the sequence in which the marker colours are overlaid.

In this phase of the method, horizontal and vertical correction values are now available in the edge region of the screen which cannot be seen, for all three primary colours. In principle, it is desirable for corresponding correction values also to be determined within the screen, for example at the centre. This could be done, for example, by means of a further sensor at the centre of the screen. However, this sensor could have a disturbing effect on the viewer. The present exemplary embodiment of the invention thus adopts a different approach. Instead of arranging a sensor at the centre, the centre is marked by a cruciform cursor 23. Other cursor shapes are also suitable for this purpose, of course. The said marking of the centre is advantageously carried out by means of a green cursor since, in this context, the tube for the colour green is distinguished from the other tubes for the colours red and blue by being arranged more symmetrically with respect to the screen 1, as can be seen from FIG. 1. For this reason, before the convergence has been corrected, the green convergence raster generally has the least distortion, so that the centre of the screen 1 can be determined most accurately using the green convergence raster.

Specifically, the centre of the screen 1 is determined by arithmetic averaging from the horizontal correction values at the positions of the sensors II and VII, and the vertical correction values at the positions of the sensors IV and V. The determined vertical correction values for green for the sensors IV and V are denoted, for short, by EGV4 and EGV5. The vertical correction value EGVC at the centre is thus given by:

$$EGVC=(EGV4+EGV5)/2 \quad (1).$$

The determined horizontal correction values for green for the sensors II and VII are denoted in a corresponding manner, for short, by EGH2 and EGH7. The horizontal correction value EGHC at the centre is thus given by:

$$EGHC=(EGH2+EGH7)/2 \quad (2).$$

A cursor cross 23 is overlaid at the centre, as is shown in FIG. 3. A red cursor is now overlaid at the centre, and the user uses manual control commands, which are input, for example, by means of a remote control, to make this coincide with the green cursor 23. The horizontal and vertical convergence correction values determined in this way are likewise stored in the memory M. A precisely corresponding approach is used with a blue cursor.

In principle, the sequence of the colours is also irrelevant for the marking of the centre and the subsequent determination of the correction values, even though the colour green is distinguished from the other two colours in the way described further above.

At the end of this procedure, a total of 48 horizontal and vertical convergence correction values for all three primary colours are now available at nine points on the screen (48=8×2×3), and these are used as support points for calculating correction values over the entire screen 1. In a next step, intermediate values of the horizontal correction values for green are calculated for this purpose. To this end, the measured horizontal correction values are interpolated in the horizontal direction along a first, a second and a third interpolation path 26, 27, 28. Mathematically, this can be described as follows:

$$\delta h(x)=a_2 x^2+a_1 x+a_0, \quad (3)$$

where $\delta h(x)$ is the horizontal correction value on the horizontal coordinate x. Equation (3) applies to each of the interpolation paths 26, 27, 28, with the vertical components each being constant due to the arrangement of the sensors I to VIII and of the sensor cross 23. The values of the horizontal coordinates are −6, 0 and +6, as can be seen from FIG. 3. The solution for the coefficients is given by:

$$\begin{pmatrix} \delta h(-6) \\ \delta h(0) \\ \delta h(6) \end{pmatrix} = \begin{pmatrix} 6^2 & -6 & 1 \\ 0 & 0 & 1 \\ 6^2 & 6 & 1 \end{pmatrix} * \begin{pmatrix} a_2 \\ a_1 \\ a_0 \end{pmatrix} \quad (4),$$

where the unknown coefficients $a_0$, $a_1$, $a_2$ form the components of a vector A, and the horizontal correction values $\delta h(-6)$, $\delta h(0)$ and $\delta h(6)$ form the components of a vector C. Written in matrix form, equation (4) can be represented in shortened form as $$C=\underline{M} \times A \quad (4')$$

where $\underline{M}$ is a matrix.

Solving equation (4') for A gives:

$$A=\underline{M}^{-1} \times C \quad (5)$$

In the end, this gives the coefficients of a parabola which connects the measured horizontal correction values on the interpolation path 26 to one another. A corresponding calculation is also carried out for the interpolation paths 27 and 28. Intermediate values are then calculated, which indicate the correction values at the intersections of the interpolation parabolae with the vertical lines 21 of the convergence raster 19. Thus, three sets of correction values are calculated, with the coordinates (−7, −5.75), (−6, −5.75), . . . (7, −5.75); (−7,0), (−6,0), . . . (7,0) and (−7, 5.75), (−6, 5.75), . . . (7, 5.75). To illustrate this, FIG. 4 shows the screen 1 from FIG. 3 without a convergence raster 19 while, in contrast, the positions at which convergence values are calculated or measured are denoted by crosses 29.

Figure 4:
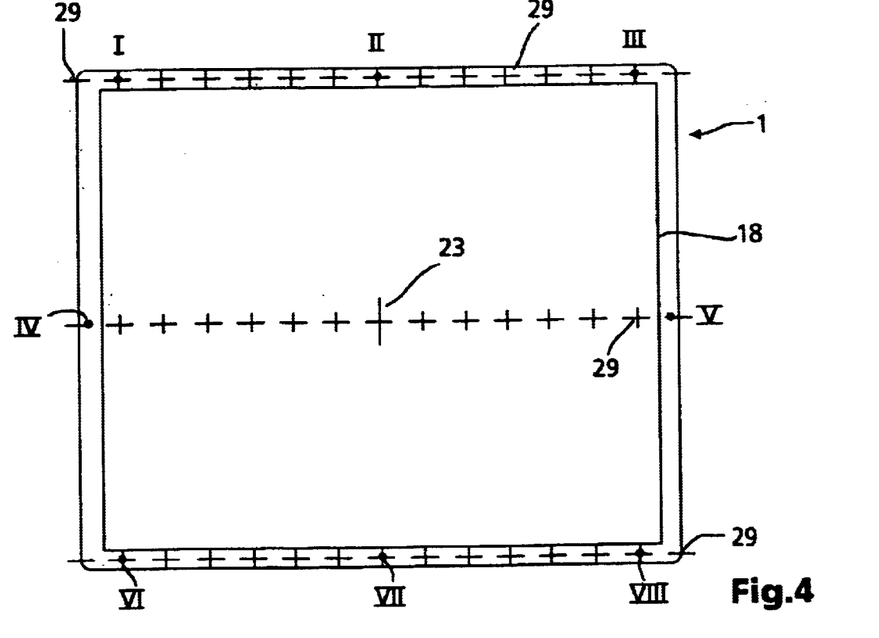
FIG. 4 shows the screen from FIG. 3 indicating the positions at which convergence values are measured and calculated.
Figure 5:
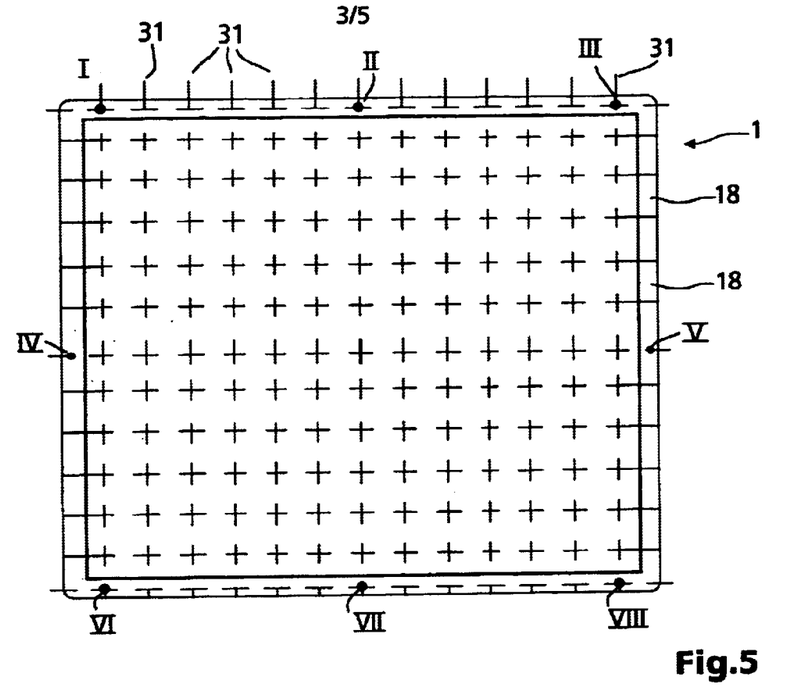
FIG. 5 shows the screen from FIG. 3, once the calculation of the convergence correction values has been completed.

The correction values marked by the crosses 29 once again form three support points in the vertical direction, as can be seen by a glance at FIG. 4, so that interpolation parabolae in the vertical direction can be calculated using the same method, and are indicated by thick dashed lines 31 in FIG. 5. Correction values for the intersections with the horizontal lines 22 for the convergence raster 19 are then calculated along the lines 31. The points on the screen 1 at which the correction values are calculated are indicated by crosses 32 in FIG. 5. Calculated horizontal correction values for green are now available over the entire screen 1. Vertical correction values can also be calculated for the same points on the screen in an entirely corresponding manner, in which case the initial equation is then:

$$\delta v(x)=a_2 x^2+a_1 x+a_0 \qquad (3')$$

where $\delta v(x)$ is the horizontal correction value at the horizontal coordinate x. This procedure is then repeated for the two other primary colours, so that horizontal and vertical correction values are then available for all three primary colours at each crossing point on the convergence raster. The horizontal and vertical convergence correction values $\delta h$ and $\delta v$, respectively, are each stored in the form of a matrix:

$$\begin{bmatrix} \Delta_{-7,-6} & \Delta_{-6,-6} & | & | & | & | & | & | & \Delta_{7,-6} \\ \Delta_{-7,-5} & | & | & | & | & | & | & | & | \\ | & | & | & | & | & | & | & | & | \\ | & | & | & | & | & | & | & | & | \\ | & | & | & | & | & | & | & | & | \\ | & | & | & | & | & | & | & | & | \\ | & | & | & | & | & | & | & | & | \\ | & | & | & | & | & | & | & | & | \\ \Delta_{-7,5} & | & | & | & | & | & | & | & \Delta_{7,5} \\ \Delta_{-7,6} & \Delta_{-6,6} & | & | & | & | & | & | & \Delta_{7,6} \end{bmatrix}$$

where, for the sake of brevity, $\Delta$ represents either $\delta h$ or $\delta v$.

The described calculation sequence should be regarded only as an example and may be varied widely without changing anything relating to the final outcome and without departing from the fundamental idea of the invention. This fundamental idea of the invention is for convergence correction values to be determined by measurement at the screen edge which cannot be seen, and then for convergence correction values for the entire screen to be calculated by interpolation between these values.

It is also feasible to use functions other than parabolae for interpolation, in particular n-th order polynomials, so that the equations (3) and (3') assume the general form:

$$\delta h_i = I_n(x_i) \text{ where } 0 <= i <= n \text{ and} \qquad (6)$$

$$\delta v_i = I_n(x_i) \text{ where } 0 <= i <= n \qquad (6')$$

The solution for the polynomials In can be determined using the known Lagrange or Newton solution schemes. It can be seen directly from equations (6) and (6') that more sensors are required for interpolation polynomials whose order is greater than 2, as is shown in FIG. 3. This means greater complexity and increased costs for production of the television set. At the same time, the computation complexity to carry out the method also increases so that, for a given computation performance, the time period required to carry out the convergence correction is increased. Nevertheless, this additional complexity may be justified for certain types of equipment.

Figure 6:
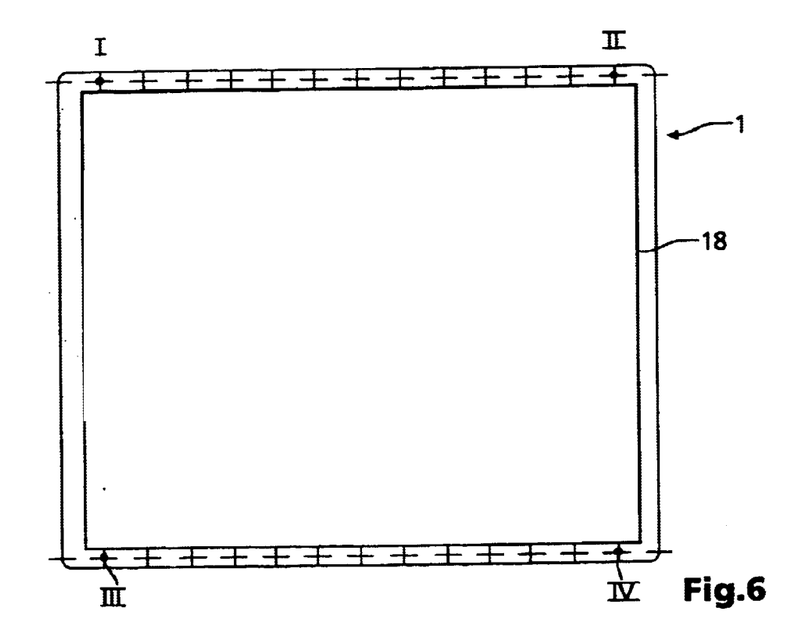
FIG. 6 shows a screen of a projection television set having four sensors.

If, on the other hand, linear functions are used for interpolation instead of parabolae, the opposite situation applies, with both the apparatus complexity and the computation complexity being reduced. FIG. 6 thus shows a further embodiment of the invention. The major difference between this embodiment and that described above is that only four optical sensors, instead of eight, are now arranged in the region of the screen which cannot be seen. The interpolation functions are thus straight lines. As described above, intermediate values of the convergence correction values are calculated along these straight lines, and lie on the vertical lines 21 of the convergence raster 19. Starting from the intermediate values as support points, further interpolation straight lines are calculated in the vertical direction, which extend transversely over the entire screen 1, so that, with respect to the distribution of the correction values, this once again essentially results in the situation as shown in FIG. 5. The described calculation is carried out for both horizontal and vertical correction values, for each primary colour. With this exemplary embodiment as well, the calculation sequence is largely irrelevant, so that the described sequence should be regarded only as an example.

Figure 7:
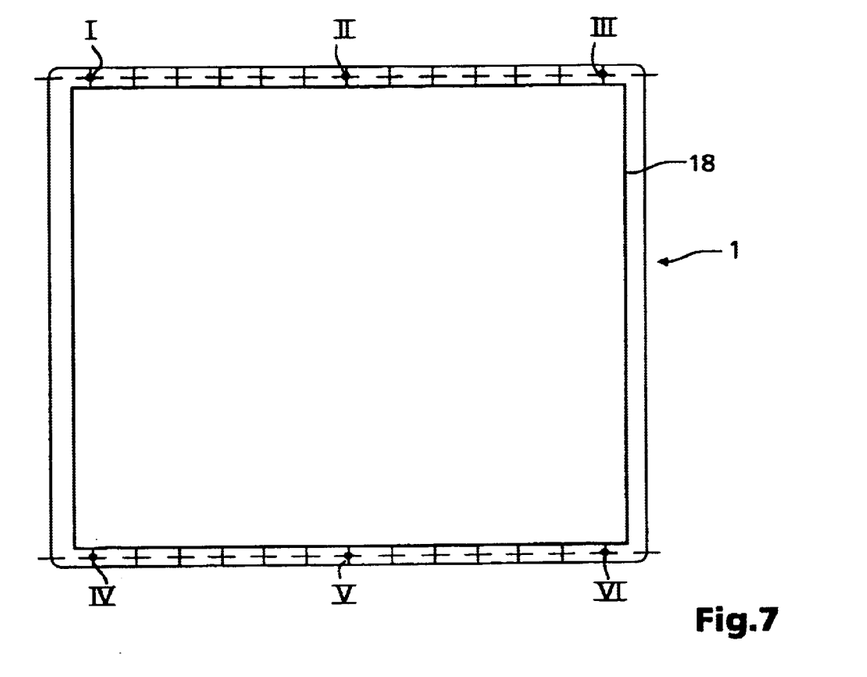
FIG. 7 shows a screen of a projection television set having six sensors.

FIG. 7 shows a further embodiment of the invention. This embodiment is equipped with six sensors, which initially allow the calculation of two interpolation parabolae. The intermediate values of these parabolae give support points for vertical interpolation straight lines, which extend over the entire screen. From FIG. 7, it is obvious to a person skilled in the art that three vertical interpolation straight lines could also be calculated initially, whose intermediate values are used as support points for horizontal interpolation parabolae.

Figure 8:
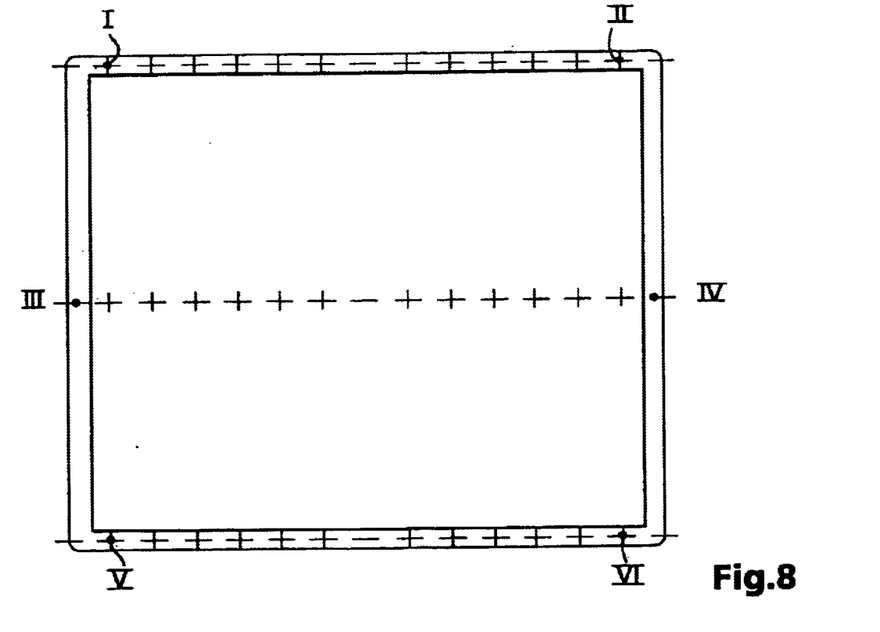
FIG. 8 shows the screen of a modified embodiment of a projection television set from FIG. 7.

This consideration leads to a variant of the invention which is shown in FIG. 8 and likewise has six optical sensors. In this case, three horizontal interpolation straight lines are calculated initially, whose intermediate values form support points for the determination of vertical interpolation parabolae.

For the two last-mentioned modifications of the invention, it is once again, of course, necessary for all the correction values, that is to say horizontal and vertical correction values, to be calculated for each primary colour, even if this has not been expressly stated, for the sake of brevity. It should likewise be noted that, in these modifications as well, the calculation sequence can be varied widely without influencing the result.

The described method allows good results to be achieved in a simple way. However, practical experiments have shown that it is impossible to shift a marker purely horizontally in translation on the screen by passing current through a horizontal convergence coil. A corresponding situation applies to the vertical convergence coils and vertical translational shifting of a marker. This situation is illustrated in an axis system in FIG. 9 in which the x and y axes indicate the horizontal and vertical directions, respectively. The direction in which a marker is shifted when current flows through a horizontal convergence coil is shown by the dashed line H in FIG. 9. The direction in which a marker is shifted when current flows through its associated vertical convergence coil is shown by the dashed line V in FIG. 9. It can clearly be seen that, in both cases, the actual movement of the marker on the screen 1 of the television set comprises a superimposed vertical and horizontal movement. The reasons for this may be, for example, imaging effects or non-homogeneous deflection fields.

Figure 9:
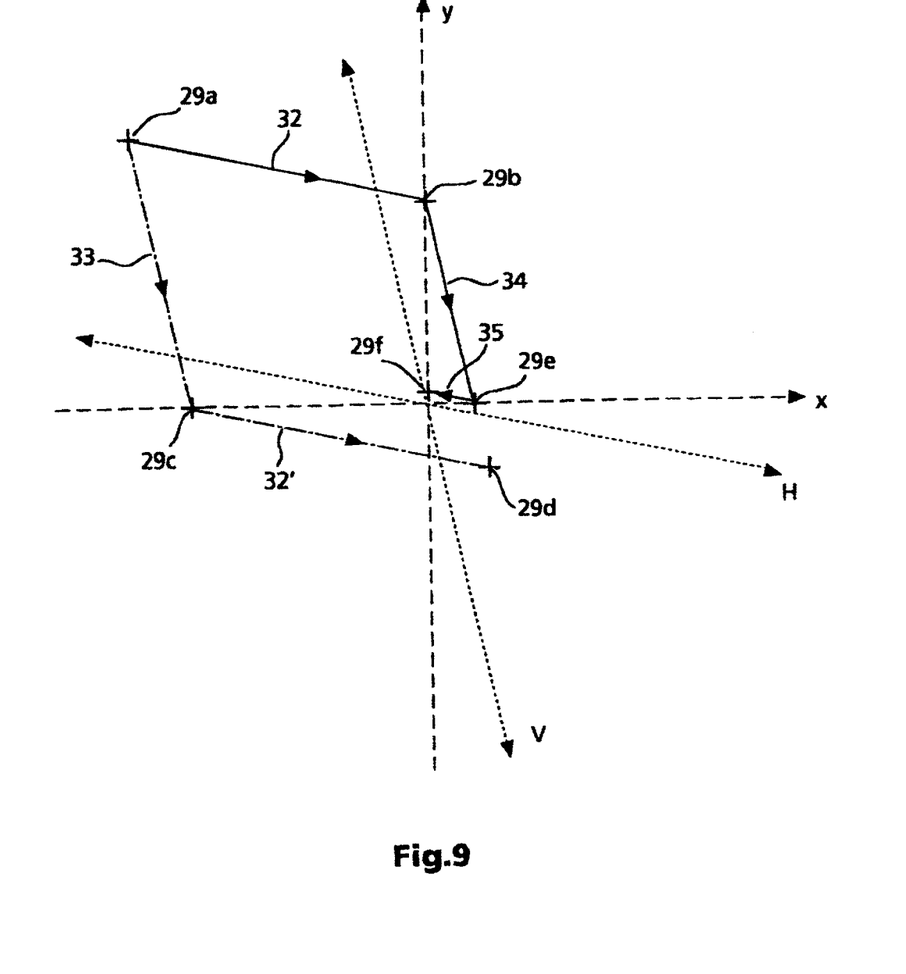
FIG. 9 shows a schematic illustration illustrating how the marker approaches the required position from an initial position.

This phenomenon influences the accuracy with which the required position of a marker can be determined, as is shown in FIG. 9. At the start of the measurement procedure described initially, a marker is located at the position denoted by 29a at some distance from its required position, which is defined by the intersections of the X and Y axes. The magnetic field of the horizontal conversion coils shifts the marker along the line 32 until the marker reaches the Y axis and assumes the position denoted by 29b. The magnetic field of the horizontal convergence coils is then switched off, and the marker returns to its original position 29a. After this, a magnetic field is applied by means of the vertical convergence coils and shifts the marker along the line 33 to the position denoted by 29c. Following this, the magnetic field from the vertical convergence coils is switched off once again. The convergence values corresponding to the convergence magnetic fields determined in this way are stored, for the relevant sensor and the relevant marker colour, in a memory. The convergence correction method according to the invention is based on the stored correction values being suitable for shifting the marker from its initial actual position to its required position at the intersection of the X and Y axes. On the assumption that the horizontal and vertical convergence coils shift the marker parallel to the horizontal axis and the vertical Y axis respectively, this aim would also be achieved. However, since the marker is actually shifted along the H and V axes, respectively, by the convergence coils, the final position of the marker, denoted by 29d, differs from the required position, since the shift takes place along the lines 33 and 32'. The said discrepancy can have a disadvantageous effect on the accuracy of the convergence correction.

A modification of the method according to the invention allows the marker to approach the desired required position more closely. According to the modified method, the marker is shifted from the initial position 29a, by means of a magnetic field from the horizontal convergence coils, along the line 32 to the position 29b. This magnetic field is now maintained and, in addition to it, a further magnetic field is applied by means of the vertical convergence coils, which shifts the marker from the position 29b along the line 34 to the position 29e. As can clearly be seen in FIG. 9, the position 29e is actually closer to the required position than the position 29d which is achieved using the previously described procedure. The marker can be moved even closer to the required position by recorrecting the horizontal convergence field while maintaining the vertical convergence field. In this case, the marker is moved along the line 36 from the position 29e to the position 29f. It is obvious to a person skilled in the art than any desired proximity between the marker and the required position is possible by iteration of these steps. However, as a rule, the accuracy achieved at the position 29f, which is reached in three steps, is sufficient for all practical requirements.

What is claimed is:

1. A method for automatically determining a center of a projected image in a projection television display apparatus having a plurality of sensors located at edges of a projection screen, comprising the steps of:
    a) projecting a marker within said image from a tube to a first sensor location on said projection display screen;
    b) adjusting a deflection parameter of said tube to move said image and marker until detected by said first sensor,
    c) saving a first value of said deflection parameter related to said first sensor detecting said image;
    d) projecting said image and marker from said tube to a second sensor located at an opposite screen edge;
    e) adjusting said deflection parameter of said tube to move said image and marker until detected by said second sensor;
    f) saving a second value of said deflection parameter related to said second sensor detecting said image;
    g) determining said center of said projected image with said first and second values.

2. The method of claim 1, wherein said projecting step comprises the step of moving said image and marker in only one raster scan direction to said second sensor located at an opposite screen edge.

3. The method of claim 1, wherein said determining step comprises the step of averaging said first and second values to determine a first center of said projected image.

4. The method of claim 1, comprising the steps of; repeating said steps a)–c)
    h) projecting said image and marker to a third sensor located on a second opposite screen edge;
    i) adjusting said deflection parameter of said tube to move said image and marker until detected by said third sensor;
    j) saving a third value of said deflection parameter related to said third sensor detecting said image; and,
    k) determining a second center of said projected image by averaging said first and third values.

5. The method of claim 4, comprising an additional step of; performing said steps a–k with a green image.

6. The method of claim 5, comprising an additional step of; adding a fixed marker to said green image located at said first and second center locations.

7. The method of claim 4, comprising an additional step of; performing said steps a–k with a red image.

8. The method of claim 7, comprising an additional step of; adding a red movable marker at said first and second center locations of said red image and adjusting said red movable marker to overlay said fixed marker added to said green image.

9. The method of claim 7, comprising an additional step of; performing said steps a–k with a blue image.

10. The method of claim 9, comprising an additional step of; adding a blue movable marker at said first and second center locations of said red image and adjusting said blue movable marker to overlay said fixed marker added to said green image.

11. The method of claim 8, comprising an additional step of; recalculating red convergence values in accordance with said red movable marker adjustment.

12. The method of claim 9, comprising an additional step of; recalculating blue convergence values in accordance with said blue movable marker adjustment.

13. A method for positioning a marker to illuminate a sensor on a raster scanned display screen comprising the steps of:
    a) projecting a raster scanned image containing said marker on to said display screen;
    b) moving said marker in a first raster scanning direction until said marker illuminates said sensor;
    c) maintaining a first magnetic field required to cause said marker to illuminate said sensor;
    d) moving said marker in a second raster scanning direction until said marker illuminates said sensor; and
    e) maintaining a second magnetic field required to cause said marker to illuminate said sensor.

14. The method of claim 13 comprising the step of:
    f) repeating said steps a–e until said marker illuminates said sensor in said first and second raster directions without further movement.

* * * * *